(12) United States Patent
He

(10) Patent No.: US 12,206,260 B2
(45) Date of Patent: Jan. 21, 2025

(54) SYNCHRONIZABLE PULSE POSITION MODULATION WAVEFORM WITH GUARD-SYMBOLS FOR EFFICIENT FAR-FIELD WIRELESS INFORMATION AND POWER TRANSFER

(71) Applicant: Telefonaktiebolaget LM Ericsson (publ), Stockholm (SE)

(72) Inventor: Shousheng He, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 298 days.

(21) Appl. No.: 17/783,885

(22) PCT Filed: Dec. 20, 2019

(86) PCT No.: PCT/EP2019/086836
§ 371 (c)(1),
(2) Date: Jun. 9, 2022

(87) PCT Pub. No.: WO2021/121635
PCT Pub. Date: Jun. 24, 2021

(65) Prior Publication Data
US 2023/0018665 A1    Jan. 19, 2023

(51) Int. Cl.
*H02J 50/80* (2016.01)
*H02J 50/00* (2016.01)
(Continued)

(52) U.S. Cl.
CPC ............ *H02J 50/80* (2016.02); *H02J 50/001* (2020.01); *H02J 50/20* (2016.02); *H02J 50/40* (2016.02)

(58) Field of Classification Search
None
See application file for complete search history.

(56) References Cited

U.S. PATENT DOCUMENTS 6,897,772 B1    5/2005   Scheffler et al.
2015/0108847 A1 4/2015   Taylor et al.

FOREIGN PATENT DOCUMENTS

CN    101980412 A    2/2011
CN    104158269 A    11/2014
(Continued)

OTHER PUBLICATIONS

Zhang, Rong et al., "Wireless Information and Power Transfer: From Scientific Hypothesis to Engineering Practice", Aug. 2015, IEEE Communications Magazine (Year: 2015).*

(Continued)

*Primary Examiner* — Jared Fureman
*Assistant Examiner* — Joel Barnett
(74) *Attorney, Agent, or Firm* — COATS & BENNETT, PLLC

(57) ABSTRACT

A WIRT system uses synchronizable PPM waveforms to convey information and power from an ET to a remote, far-field EH. In so doing, the solution presented herein reduces receiver complexity, optimizes power transfer, and meets information transfer requirements. The synchronizable PPM waveform comprises a plurality of pulsed-modulation symbols, each of which comprises one or more pulses position-modulated responsive to the information to be conveyed to the EH. The ET configures at least one pulse in each symbol of said synchronizable PPM waveform according to one or more synchronization constraints to enable symbol synchronization at the EH. The EH converts the RF power of the received synchronizable PPM waveform to a DC voltage, and synchronizes the received PPM waveform to extract the information in the PPM waveform.

27 Claims, 10 Drawing Sheets

(51) Int. Cl.
*H02J 50/20* (2016.01)
*H02J 50/40* (2016.01)

(56) References Cited

FOREIGN PATENT DOCUMENTS

| CN | 204190475 U | 3/2015 |
| CN | 110011704 A | 7/2019 |
| JP | H06222707 A | 8/1994 |
| JP | 2003190659 A | 7/2003 |

OTHER PUBLICATIONS

Kassab, Hussein et al. "Gabor Expansion for Simultaneous Wireless Power and Information Transfer (SWIPT): Interference Analysis", 2018, Proceedings of the 018 Symposium on Information Theory and Signal Processing in the Beneluz, p. 108-117 (Year: 2018).*

Zhang, R. et al., "Wireless Information and Power Transfer: From Scientific Hypothesis to Engineering Practice", EEE Communications Magazine, Aug. 1, 2015, pp. 99-105, IEEE.

Kassab, H. et al., "Gabor Expansion for Simultaneous Wireless Power and Information Transfer (SWIPT): Interference Analysis", 2018 Symposium on Information Theory and Signal Processing in the Benelux, May 31, 2018, pp. 109-117.

Clerckx, B. et al., "Waveform Design for Wireless Power Transfer", IEEE Transactions on Signal Processing, vol. 64 No. 23, Dec. 1, 2016, pp. 6313-6328, IEEE.

Georghiades, C., "On the Synchronizability and Detectability of Random PPM Sequences", IEEE Transaction on Information Theory, vol. 35 No. 1, Jan. 1, 1989, pp. 146-156, IEEE.

Elfiqi, A., et al., "Chaotic Polarization-Assisted LDPSK-MPPM Modulation for Free-Space Optical Communications", Sep. 9, 2019, pp. 1-13, vol. 18, No. 9, IEEE.

Zhang, L. et al., "A Driving Power Supply of Semiconductor Laser for Simultaneous Transmission of Power and Information", Transactions of China Electrotechnical Society, vol. 16, No. 6, Mar. 2016, pp. 118-125, China Academic Journal Electronic Publishing House.

Zhang, L. et al. "New Three-winding Magnetic Coupling Resonant Wireless Power Transmission System and Its Optimization", High Voltage Engineering, vol. 45, No. 4, Apr. 30, 2019, pp. 1146-1152, China Academic Journal Electronic Publishing House.

Zhang, R. et al., "Wireless Information and Power Transfer: From Scientific Hypothesis to Engineering Practice", Energy Harvesting Communications, IEEE Communications Magazine, Aug. 2015, pp. 99-105, IEEE.

Gao, Z, et al., "A Modern Communication and Electronic System Experiment". 1996, p. 180, ISBN 7-81012-662-8, Beihang University Press.

China National Intellectual Property Administration Search Report for CN Application No. 2019801031224, Apr. 24, 2024, pp. 1-4 (English translation provided).

Hu, et al.; Integrated Data and Energy Communication Network: A Comprehensive Survey; IEEE Communications Surveys & Tutorials, vol. 20, No. 4; (2018); pp. 3169-3219.

* cited by examiner

SYNCHRONIZABLE PULSE POSITION MODULATION WAVEFORM WITH GUARD-SYMBOLS FOR EFFICIENT FAR-FIELD WIRELESS INFORMATION AND POWER TRANSFER

TECHNICAL FIELD

The solution presented herein relates generally to wireless power transmission systems, and more particularly to improving the power and information transferred in Wireless Information and Power Transmission (WIPT) systems using pulse-position modulation.

BACKGROUND

Far-field energy harvesting systems include an Energy Transmitter (ET) and an Energy Harvester (EH) located remotely (far-field) from each other and coupled via Radio Frequency (RF) signals, and not by inductive coupling. As used herein, far-field refers to distances separating the ET and the EH that are larger than the dimension of the transmitter coil in the ET, which may range, e.g., between tens of centimeters to a few tens of meters. Wireless Power Transmission (WPT) systems represent on example of such far-field energy harvesting systems, where the ET transmits RF power to the EH via the RF signals. Far-field Wireless Information and Power Transmission (WIPT) systems represent another example, where the ET transmits RF power and information to the EH via the RF signals. Both the energy and the information transmitted in such WIPT systems are limited by the RF-to-DC energy harvesting efficiency at the EH, which is a function of the rectenna design at the EH and the characteristics of the waveform transmitted by the ET. Ideally, the system optimizes the energy and/or information transfer.

In-phase multi-sine wave signals represent an optimal waveform for WPT systems because they have a flat response in the frequency domain, which translates into a single pulse in the time domain (with proper sampling), and thus has the highest possible Crest Factor (CF) or Peak-to-Average Power Ratio (PAPR). However, such in-phase multi-sine wave signals cannot transfer information, and thus are not suitable for WIPT systems. While general Orthogonal Frequency Division Multiplex (OFDM) signals may be used to transfer power and information, such signals are not optimal for energy transfer, and are also not optimal for efficient power transmission on the ET side because such general OFDM signals have an unpredictable Peak-to-Average Power Ratio (PAPR). Further, OFDM demodulation requires accurate time and frequency synchronization, channel information, and highly complex signal processing, all of which are beyond the general power capabilities of the EH. Thus, there remains a need for improved RF signaling options for WIPT systems.

SUMMARY

The solution presented herein provides RF waveforms that are not only suitable for power and information transmission from the ET to a remote EH far-field, but that are also synchronizable. The RF waveforms of the solution presented herein efficiently transfer energy to the EH, as well as provide a low-complexity information signal that reduces the demodulation/processing complexity at the EH. As such, the solution presented herein improves the operational efficiency of the WIPT system in general, and of the EH in particular.

According to one exemplary embodiment, a first wireless device of a Wireless Information and Power Transfer (WIPT) system comprises an energy transmitter for simultaneously conveying information and RF power via a forward link to an energy harvester in a second wireless device in the WIPT system far-field from the first wireless device. The energy transmitter comprises a pulse modulation circuit and a transmission circuit. The pulse modulation circuit is configured to generate a synchronizable Pulse-Position Modulation (PPM) waveform comprising a plurality of pulsed-modulation symbols. Each of the pulsed-modulation symbols comprises one or more pulses position-modulated responsive to the information to be conveyed to the energy harvester. The transmission circuit is configured to transmit the synchronizable PPM waveform to the energy harvester via the forward link. At least one pulse in each symbol of said synchronizable PPM waveform is configured according to one or more synchronization constraints to enable symbol synchronization at the energy harvester.

According to one exemplary embodiment, a method simultaneously conveys information and RF power via a forward link from an energy transmitter of a first wireless device in a Wireless Information and Power Transfer (WIPT) system to an energy harvester in a second wireless device in the WIPT system far-field from the first wireless device. The method comprises generating a synchronizable Pulse-Position Modulation (PPM) waveform comprising a plurality of pulsed-modulation symbols. Each of the pulsed-modulation symbols comprises one or more pulses position-modulated responsive to the information to be conveyed to the energy harvester. The method further comprises transmitting the synchronizable PPM waveform to the energy harvester via the forward link. At least one pulse in each symbol of said synchronizable PPM waveform is configured according to one or more synchronization constraints to enable symbol synchronization at the energy harvester.

According to one exemplary embodiment, a computer program product for simultaneously conveys information and RF power from an energy transmitter of a first wireless device in a Wireless Information and Power Transfer (WIPT) system to an energy harvester in a second wireless device in the WIPT system far-field from the first wireless device. The computer program product comprises software instructions which, when run on at least one processing circuit in the energy transmitter, causes the energy transmitter to execute the energy transmitter method disclosed herein. In one exemplary embodiment, a computer-readable medium comprises the computer program product, where the computer-readable medium may comprise a non-transitory computer readable medium.

According to one exemplary embodiment, a second wireless device of a Wireless Information and Power Transfer (WIPT) system the second wireless device comprises an energy harvester comprising a rectenna, a power circuit, and a processing circuit. The rectenna is configured to receive a synchronizable Pulse-Position Modulation (PPM) waveform via a forward link from an energy transmitter in a first wireless device in the WIPT system far-field from the second wireless device. The received synchronizable PPM waveform comprises a plurality of pulsed-modulation symbols. Each of the pulsed-modulation symbols comprises one or more pulses position-modulated responsive to information being conveyed by the first wireless device to the second wireless device. The power circuit is configured to generate a DC voltage responsive to RF power provided by the plurality of pulsed-modulation symbols in the received synchronizable PPM waveform. The processing circuit is powered by the power circuit responsive to the generated DC voltage and is configured to synchronize the pulsed-modulation symbols of the received synchronizable PPM waveform to extract the information from the received synchronizable PPM waveform.

According to one exemplary embodiment, a method harvests energy and retrieves information in an energy harvester of a second device of Wireless Information and Power Transfer (WIPT) system. The method comprises receiving a synchronizable Pulse-Position Modulation (PPM) waveform via a forward link from an energy transmitter in a first wireless device in the WIPT system far-field from the second wireless device. The received synchronizable PPM waveform comprises a plurality of pulsed-modulation symbols. Each of the pulsed-modulation symbols comprising one or more pulses position-modulated responsive to information being conveyed by the first wireless device to the second wireless device. The method further comprises generating a DC voltage responsive to RF power provided by the plurality of pulsed-modulation symbols in the received synchronizable PPM waveform. The method further comprises synchronizing the pulsed-modulation symbols of the received synchronizable PPM waveform to extract information from the received synchronizable PPM waveform in a processing circuit powered by the power circuit responsive to the generated DC voltage.

According to one exemplary embodiment, a computer program product for controlling an energy harvester in a second wireless device of Wireless Information and Power Transfer (WIPT) system. The computer program product comprises software instructions which, when run on at least one processing circuit in the energy harvester, causes the energy harvester to execute the energy harvester method disclosed herein. In one exemplary embodiment, a computer-readable medium comprises the computer program product, where the computer-readable medium may comprise a non-transitory computer readable medium.

DETAILED DESCRIPTION

Because Wireless Information and Power Transmission (WIPT) systems transfer power as well as information, such systems differ dramatically from conventional wireless communication systems, which only focus on the transfer of information. Multiple factors, e.g., rectenna design, signal waveform design, etc., control the energy conversion efficiency of such WIPT systems. Even with advanced rectenna designs, there is a fundamental trade-off between the effectiveness of the energy transfer and the effectiveness of the information transfer. As such, it is not possible to optimize both the energy transfer and the information transfer. Because a WIPT system is most limited by its energy transfer efficiency, e.g., because the energy transfer efficiency defines how much energy is available to power the EH, the solution presented herein seeks to optimize the efficiency of the RF energy transfer while keeping in mind information transfer requirements. The solution presented herein also seeks to reduce the complexity of the signal processing required at the EH so as to indirectly improve the overall energy efficiency, e.g., by reducing the energy requirements/consumption of the EH. To that end, the solution presented herein uses Pulse-Position Modulation (PPM) to generate a forward link PPM waveform that not only efficiently transfers RF energy, but also reduces the signal processing complexity at the EH.

Figure 1:
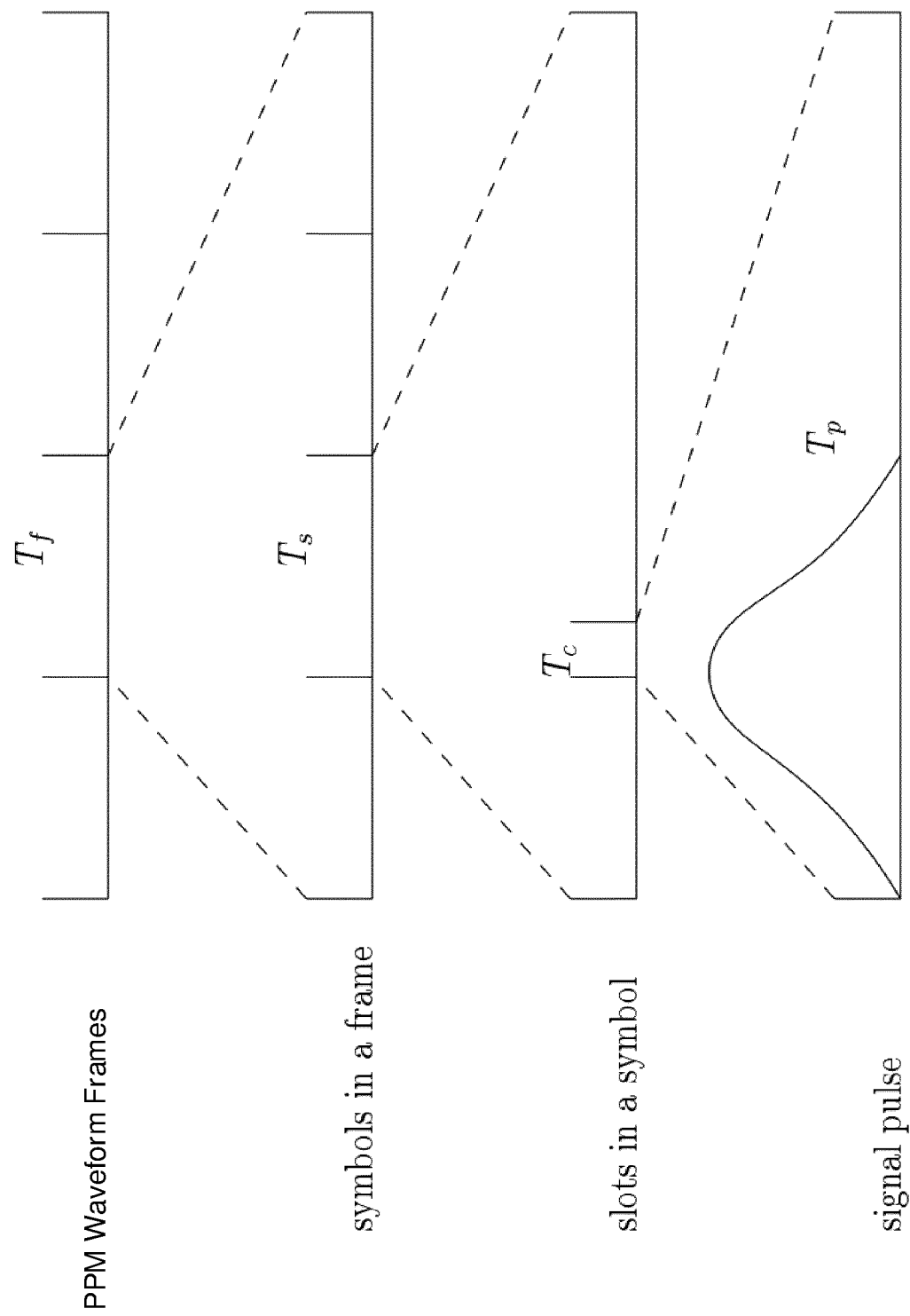
FIG. 1 shows an exemplary waveform structure.
Figure 2:
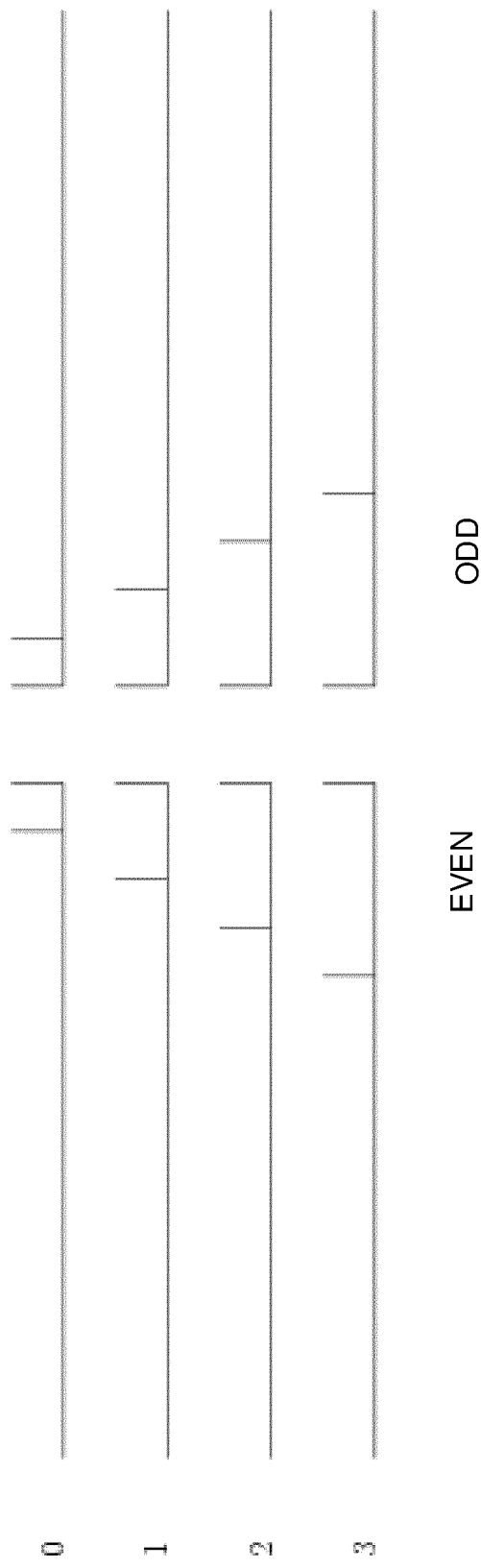
FIG. 2 shows exemplary construction of modulation symbols with sync pulses in even and odd positions for PPM waveforms.

To better understand the details of the solution presented herein, the following first generally explains PPM waveforms. As shown in FIG. 1, a PPM waveform comprises a plurality of frames, each having a duration of $T_f$ seconds. Each frame has $N_s$ symbols of duration $T_s$ seconds, where $T_f=N_sT_s$. Each symbol has $N_c$ slots (also known as chips) having a duration of $T_c$ seconds, where $N_c=2^D$ when transmitting D bits information with a symbol alphabet of size $Q=2^D$. PPM places a single pulse in one of the slots at the encoding position corresponding to the information to be conveyed. As such, the resulting PPM waveform will have low processing complexity.

PPM waveforms are known to be prone to synchronization errors, which will degrade system performance. Thus, the solution presented herein provides a synchronizable PPM waveform. The WIPT system may achieve synchronization at different levels of the waveform, e.g., frame synchronization, symbol synchronization, and/or slot synchronization. With frame synchronization, the frame boundary is set so that the demodulation information will be in a predefined structure and semantics. With symbol synchronization, the symbol boundary is set sot that the PPM waveform may be correctly demodulated. With slot synchronization, the slot boundary is set so as to maximize the signal-to-noise ratio (SNR) for demodulation. While each of these synchronization levels is important, symbol synchronization has proven to be the most crucial and challenging. Thus, the solution presented herein uses a synchronizable PPM waveform to convey the RF power and information, where at least one pulse in each symbol of the synchronizable PPM waveform is configured according to one or more synchronization constraints to enable at least symbol synchronization at the EH. As discussed further below, exemplary synchronization constraints include the use of guard symbols along with the location of a sync pulse in the PPM waveform in a designated sync slot, e.g., in slot zero of each symbol, along with symbol flipping.

Figure 3:
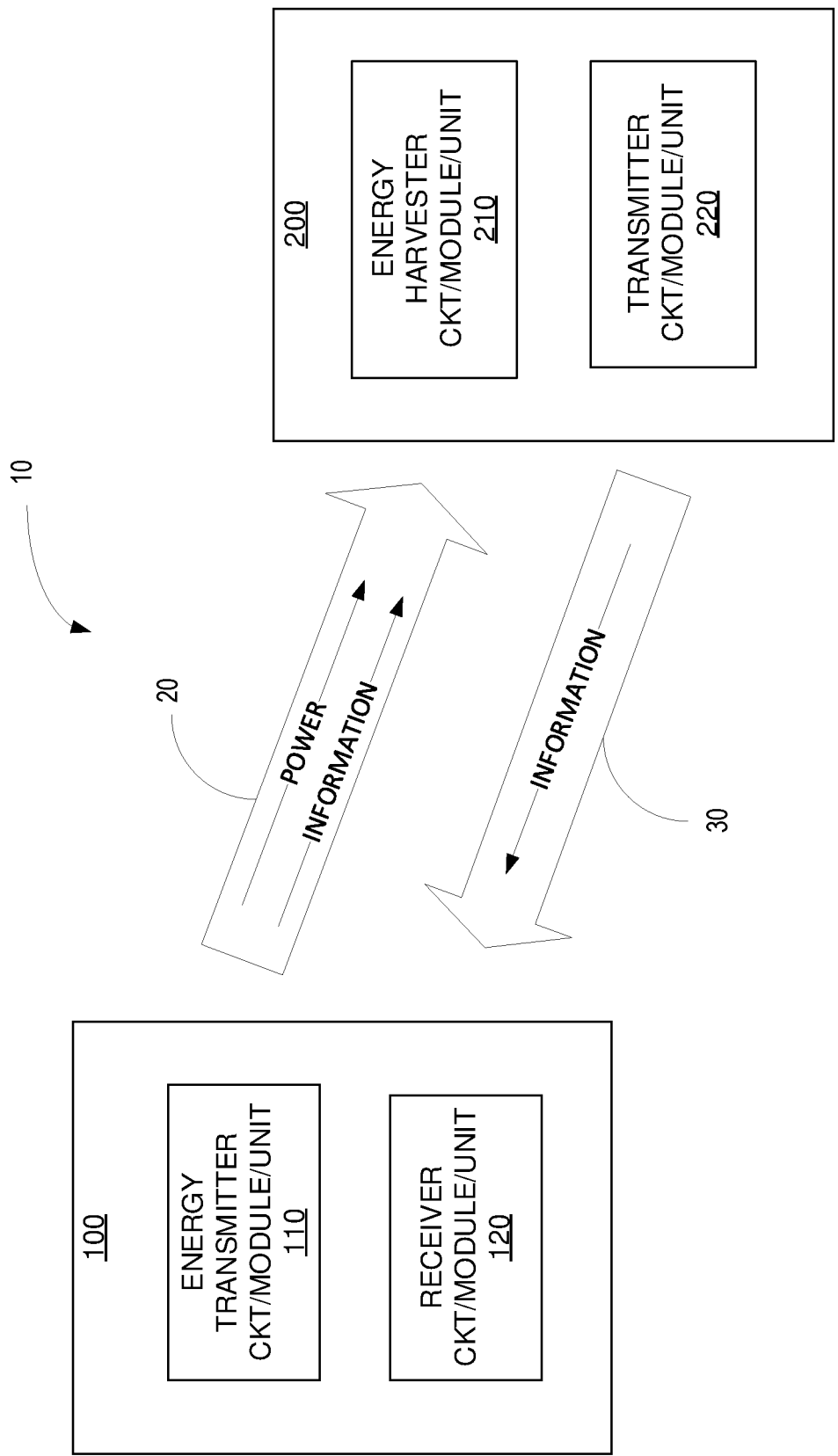
FIG. 3 shows a block diagram of an exemplary WIPT system according to one exemplary embodiment.

FIG. 3 shows a block diagram of an exemplary WIPT system 10 according to exemplary embodiments disclosed herein. The WIPT system 10 comprises a first wireless device 100 and a second wireless device 200 far-field from the first wireless device 100. The first wireless device 100 comprises an Energy Transmitter (ET) 110 and a receiver 120, and the second wireless device 200 comprises an Energy Harvester (EH) 210 and a transmitter 220. As elaborated further below, ET 110 functions as an information transmitter as well as an energy transmitter, and EH 210 also functions as an information retriever as well as an energy harvester. The ET 120 sends a synchronizable PPM waveform to the EH 210 via forward link 20 (or downlink), while the transmitter 220 in the second wireless device 200 sends a waveform comprising information, e.g., in response to the information received from the ET 110, to the receiver 120 in the first wireless device 100 via a reverse link 30 (or uplink). While not required, it will be appreciated that the reverse link waveform sent on the reverse link 30 may have the same format as the PPM waveform sent on the forward link 20.

According to the solution presented herein, the ET 110 generates a synchronizable PPM waveform comprising a plurality of pulsed-modulation symbols. The amplitude of these symbols conveys RF power to the EH 210, while the pulse modulation conveys information to the EH 210. The EH 210 receives the synchronized PPM waveform, generates a DC voltage from the RF power conveyed by the received PPM waveform, and synchronizes the received PPM waveform to extract the information from the PPM waveform using the generated DC power.

Figure 4:
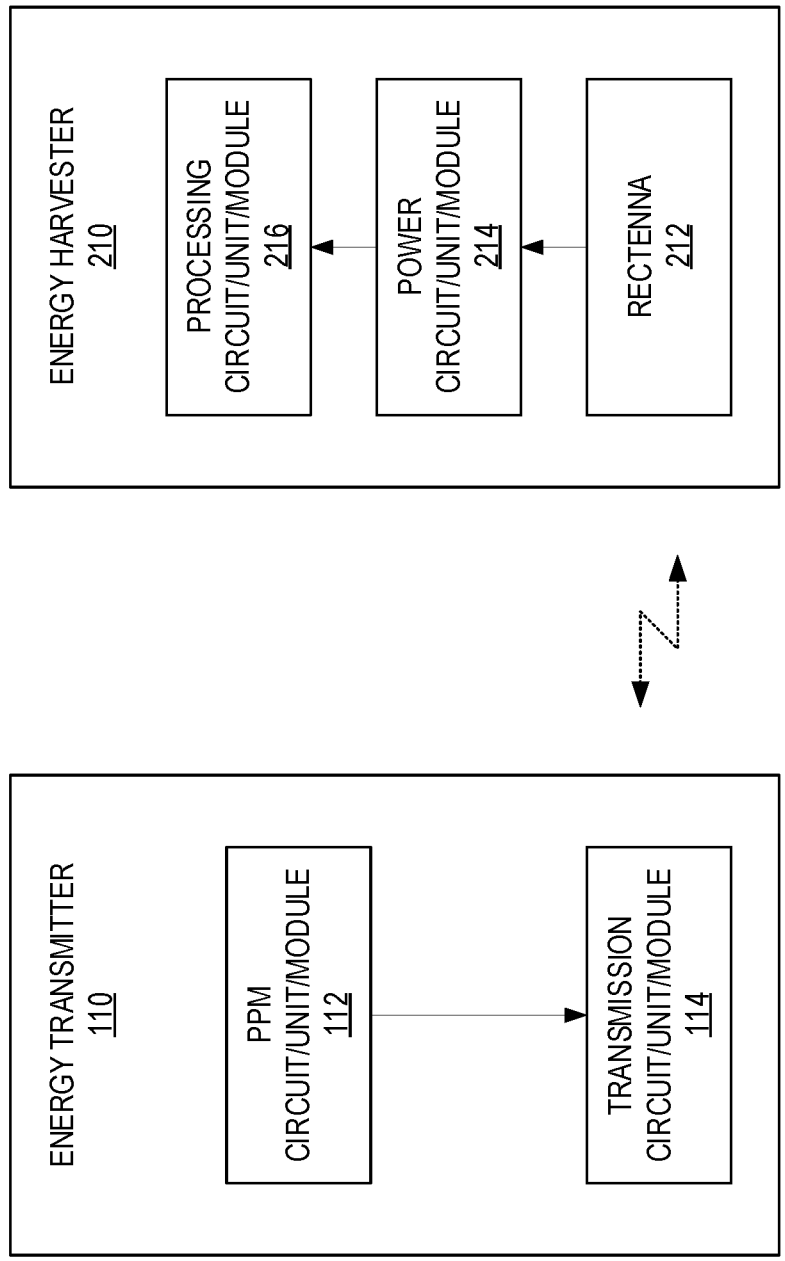
FIG. 4 shows a block diagram of an exemplary ET and EH according to one exemplary embodiment.
Figure 5:
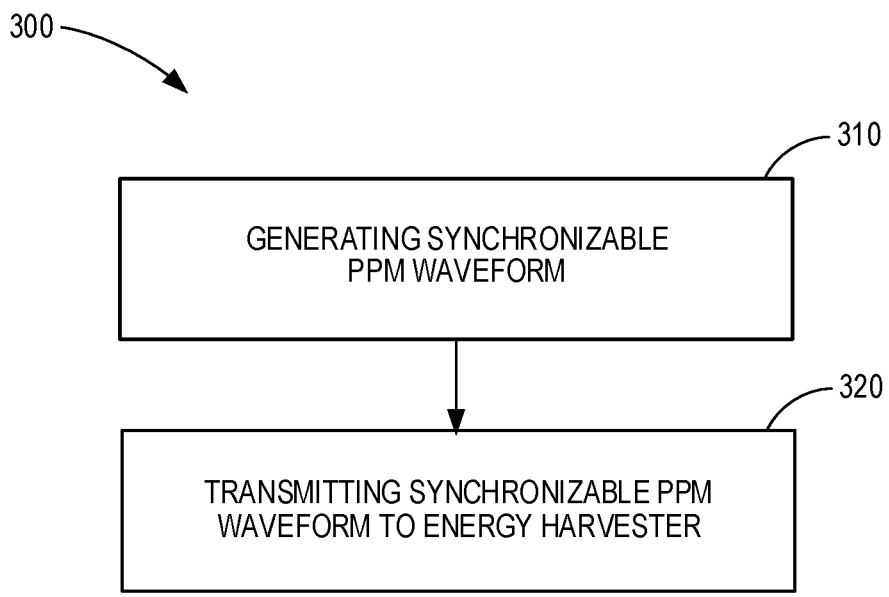
FIG. 5 shows an exemplary ET method according to one exemplary embodiment.
Figure 6:
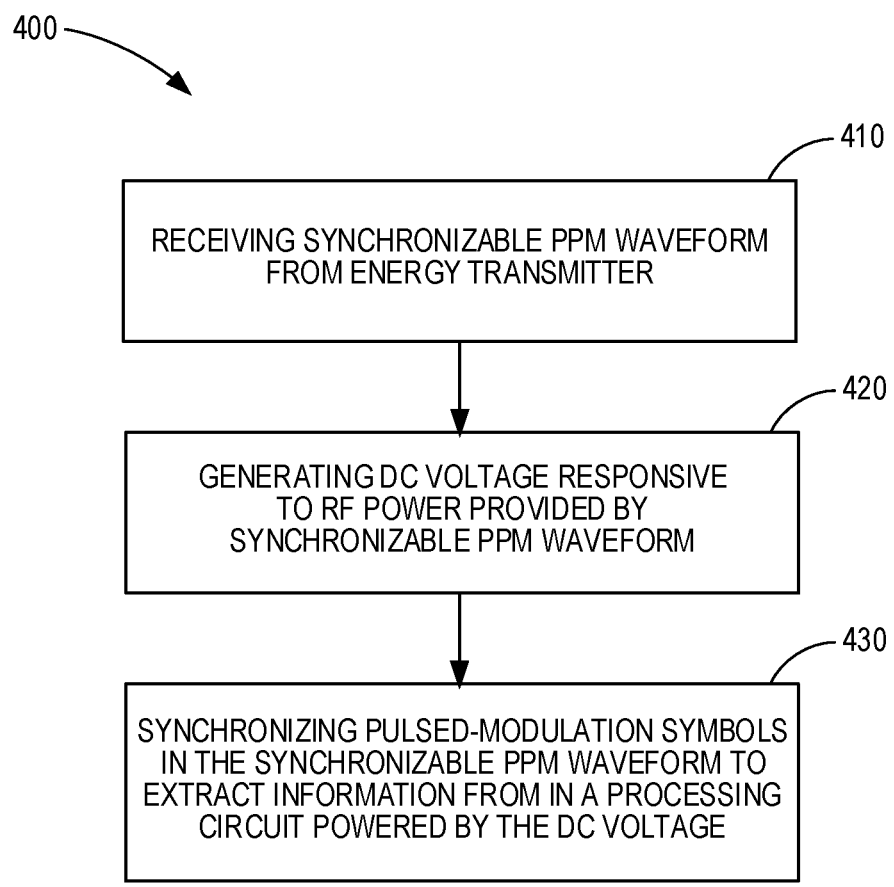
FIG. 6 shows an exemplary EH method according to one exemplary embodiment.

FIG. 4 shows block diagrams of an exemplary ET 110 and an exemplary EH 210 according to the solution presented herein, while FIG. 5 shows an exemplary method 300 implemented by the ET 110 and FIG. 6 shows an exemplary method 400 implemented by the EH 210. The following generally describes the solution presented herein while referencing the block diagrams and method charts of FIGS. 4-6. ET 110 comprises a pulse modulation circuit 112 configured to generate the synchronizable PPM waveform (block 310). Each of the pulsed-modulation symbols in the synchronizable PPM waveform comprises one or more pulses position-modulated responsive to the information to be conveyed to the EH 210. Further, at least one pulse in each symbol of the synchronizable PPM waveform is configured according to one or more synchronization constraints to enable symbol synchronization at the EH 210. The transmission circuit 114 transmits the synchronizable PPM waveform to the EH 210 via the forward link 20 (block 320).

The EH 210 comprises a rectenna 212, a power circuit, and a processing circuit 216. The rectenna 212 is configured to receive the synchronizable PPM waveform via the forward link 20 from the ET 110 (block 410). The received synchronizable PPM waveform comprises the plurality of pulsed-modulation symbols, where each of the pulsed-modulation symbols comprises one or more pulses position-modulated responsive to the information being conveyed by the first wireless device 100 to the second wireless device 200. The power circuit 214 is configured to generate a DC voltage responsive to RF power provided by the plurality of pulsed-modulation symbols in the received synchronizable PPM waveform (block 420). The processing circuit 216 is powered by the power circuit 214 responsive to the generated DC voltage, and is configured to synchronize the pulsed-modulation symbols of the received synchronizable PPM waveform to extract the information from the received synchronizable PPM waveform (block 430).

Each element of the first and second wireless devices 100, 200 may be embodied in hardware (e.g., circuits, modules, and/or units) and/or in software (including firmware, resident software, micro-code, etc.), including an application specific integrated circuit (ASIC). Furthermore, the solution presented herein may take the form of a computer program product on a computer-usable or computer-readable storage medium having computer usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, or a portable compact disc read-only memory (CD-ROM). Note that the computer-usable or computer-readable medium could even be paper or another suitable medium upon which the program is printed, as the program can be electronically captured via, for example, optical scanning or the paper or other medium, then compiled, interpreted, or otherwise processed in a suitable manner, if necessary, and then stored in a computer memory.

The following provides further details regarding exemplary PPM waveforms according to the solution presented herein, as well as synchronization details, and details regarding reverse link waveforms. These details are exemplary; other implementations that fall under the above general discussion are also covered by the solution presented herein. It will be appreciated that exemplary embodiments may include one or more of these exemplary implementations.

As noted above, it is preferable to optimize the energy provided by the forward link waveforms. To that end, the generated PPM waveform may be configured in some exemplary embodiments to have a high Peak-to-Average-Power Ratio (PAPR) to improve the energy conversion efficiency. For example, when the number of pulses in each pulsed-modulation symbol in the PPM waveform is less than or equal to 2, the resulting PPM waveform will have a high PAPR. When the alphabet size of the PPM is Q, for example, a high PAPR is a PAPR greater than or equal to $(Q+1)/2$, where R (the ratio of pulsed slots to non-pulsed slots) is $2/(Q+1)$.

Figure 7:
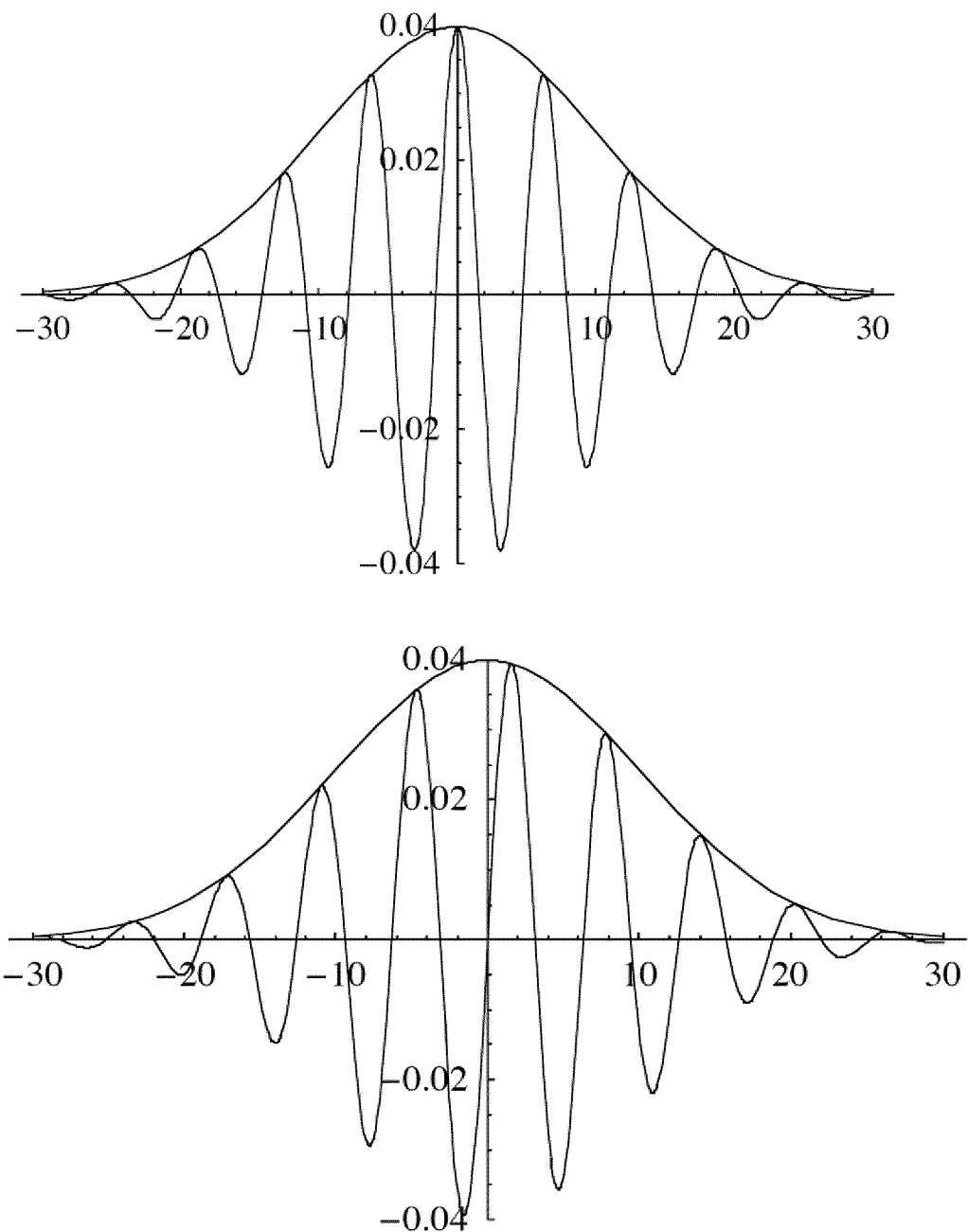
FIG. 7 shows an exemplary Gabor pulse.

As also noted above, it is preferable to reduce the complexity required for processing the forward link waveform at the EH 210. To that end, the ET 110 may use a Gabor pulse, e.g., as shown in FIG. 7, to generate each of the pulsed-modulation symbols of the synchronizable PPM waveform in some exemplary embodiments. When the Gabor pulse is used to generate the PPM waveform, the carrier and pulse width can be set independently. Further, the Gabor pulse simplifies the demodulation required at the second wireless device 200.

The solution presented herein also provides a synchronizable PPM waveform, where at least one pulse in each symbol of said synchronizable PPM waveform is configured according to one or more synchronization constraints to enable symbol synchronization at the EH 210. For example, each frame of the PPM waveform may comprise one or more pairs of composite symbols, where each composite symbol includes one or more guard symbols and the pulsed-modulation symbols. At least one pulse in each composite symbol is configured according to the synchronization constraint(s) to enable the symbol synchronization at the EH 210. In one exemplary embodiment, the synchronization constraint comprises including a sync pulse in a designated synchronization slot in each of the composite symbols. For example, the sync pulse may be included in slot zero in each pulsed-modulation symbol. In another exemplary embodiment, the synchronization constraint comprises appending a sync pulse to the corresponding pulsed-modulation symbol, e.g., appended the sync pulse to a beginning of the corresponding pulsed-modulation symbol. Regardless of the particular constraints used, the synchronization constraints governing the synchronizable PPM waveform enable the EH 210 to synchronize the received PPM waveform, and thus to demodulate and otherwise process the received PPM waveform.

In exemplary embodiments, each pair of composite symbols comprises adjacent symbols, where one of the symbols in the pair is an odd symbol and one of the symbols in the pair is an even symbol. As used herein, the "even" and "odd" labels refer to the numbering of the symbol within the frame. Thus, the symbol having an even symbol number, e.g., 0, 2, 4, etc., represents the "even" symbol in the pair, while the symbol having an odd symbol number, e.g., 1, 3, 5, etc., represents the "odd" symbol in the pair.

Figure 8:
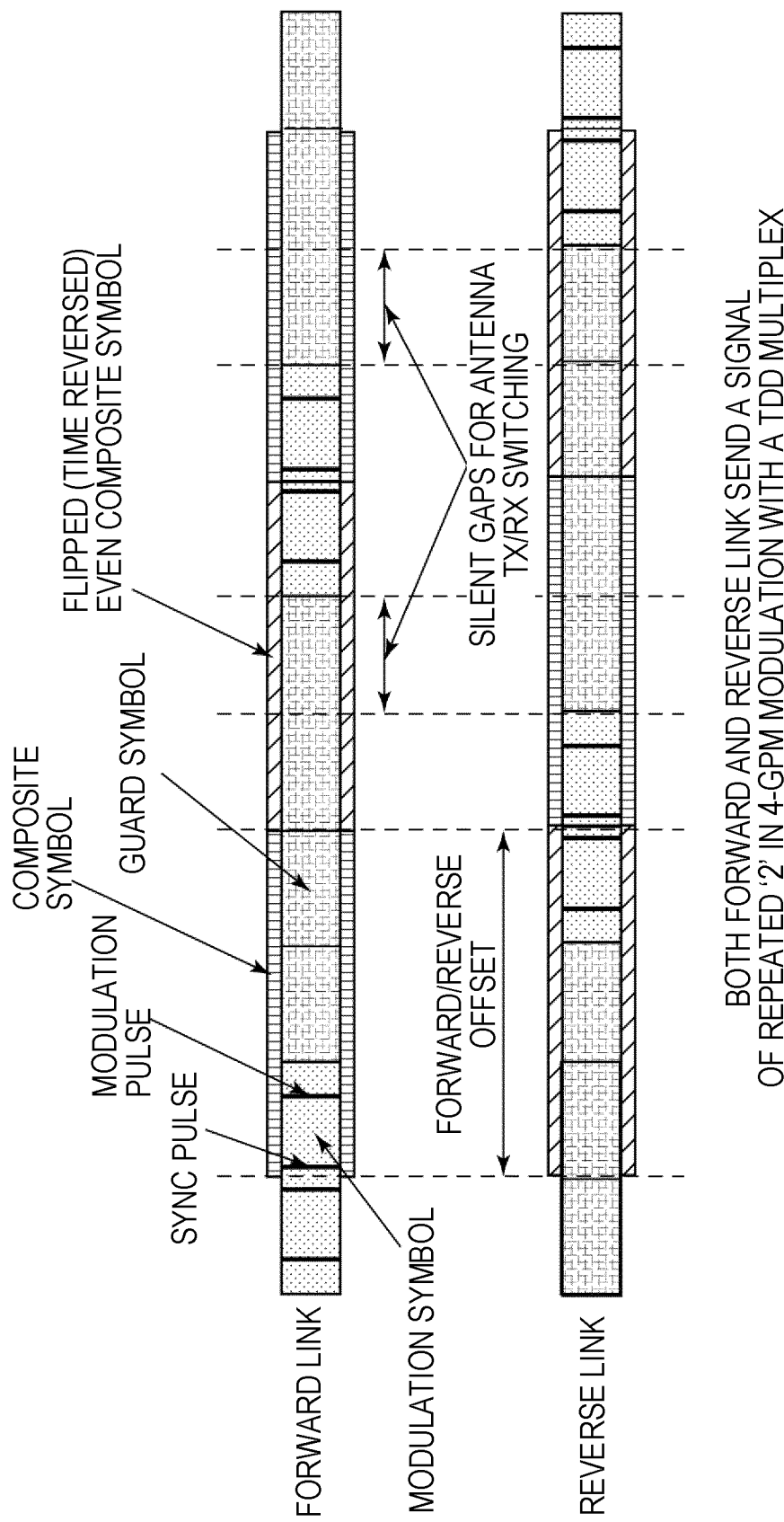
FIG. 8 shows exemplary waveforms for the time division duplexing of forward and reverse links according to exemplary embodiments of the solution presented herein.

One exemplary embodiment of the solution presented herein orders the symbols in one composite symbol in a pair of composite symbols in a flipped order relative to symbols in the other composite symbol in the pair. For example, an odd composite symbol in a pair of composite symbols may comprise the pulsed-modulation symbol(s) followed by the guard symbol(s), while the even composite symbol in the pair may comprise the guard symbol(s) followed by the pulsed-modulation symbols in a flipped order relative to the odd composite symbol. FIG. 8 shows one exemplary implementation of this embodiment of a pair of composite symbols comprising an odd composite symbol followed by an even composite symbol, where the odd composite symbol includes a sync pulse followed by the modulated pulse and two guard symbols, while the subsequent even composite symbol starts with two guard symbols, which are followed by the modulated pulse and the sync pulse. It will be appreciated that the solution presented herein is not limited to the example of FIG. 8. In another exemplary embodiment, a pair of composite symbols may comprise an even composite symbol followed by an odd composite symbol, where the even composite symbol includes a sync pulse followed by the modulated pulse and two guard symbols, while the subsequent odd composite symbol starts with two guard symbols, which are followed by the flipped modulated pulse and then the sync pulse.

As noted above, the second wireless device 200 sends information to the first wireless device 100 via the reverse link 30. Such reverse link signaling may be time division duplexed with the forward signaling from the first wireless device 100. For example, the transmitter circuit 220 in the second wireless device 200 may send a reverse link waveform via the reverse link 30, where the reverse link waveform is offset in time from the PPM waveform transmitted via the forward link 20 by an offset period, e.g., an odd number of one or more of the composite symbols. FIG. 8 shows an example of this offset period between forward link and reverse link signaling, where in this example, the offset period comprises one composite symbol symbol. While not required, such reverse link waveforms may be configured to have the same frame structure as the PPM waveform of the forward link 20. This offset period will, e.g., provide the first wireless device 100 with time to switch its antenna (not shown) between the energy transmitter 110 and the receiver 120. For example, as shown in FIG. 8, after the ET 110 transmits the PPM waveform via the forward link 20, the first wireless device 100 may use a silent period in the offset to switch its antenna connection from the ET 110 to the receiver 120 to enable the receiver 120 to receive a reverse link waveform.

In another exemplary embodiment, the time division duplexing may be achieved by using complementary flipping, while having an offset of zero or an even number of composite symbols. For example, if the forward link uses an even flip, e.g., an even composite symbol in a forward link pair of composite symbols has pulsed-modulation and guard symbols in a flipped order relative to the pulsed-modulation and guard symbols in the odd composite symbol in the pair, then the reverse link may use an odd flip for time-division duplexing, e.g., an odd composite symbol in a reverse link pair of composite symbols has pulsed-modulation and guard symbols in a flipped order relative to the pulsed-modulation and guard symbols in the even composite symbol in the pair. Similarly, if the forward link uses an odd flip, e.g., an odd composite symbol in a forward link pair of composite symbols has pulsed-modulation symbols in a flipped order relative to the pulsed-modulation symbols in the even composite symbol in the pair, then the reverse link may use an even flip for time-division duplexing, e.g., an even composite symbol in a reverse link pair of composite symbols has pulsed-modulation symbols in a flipped order relative to the pulsed-modulation symbols in the odd composite symbol in the pair.

Figure 9:
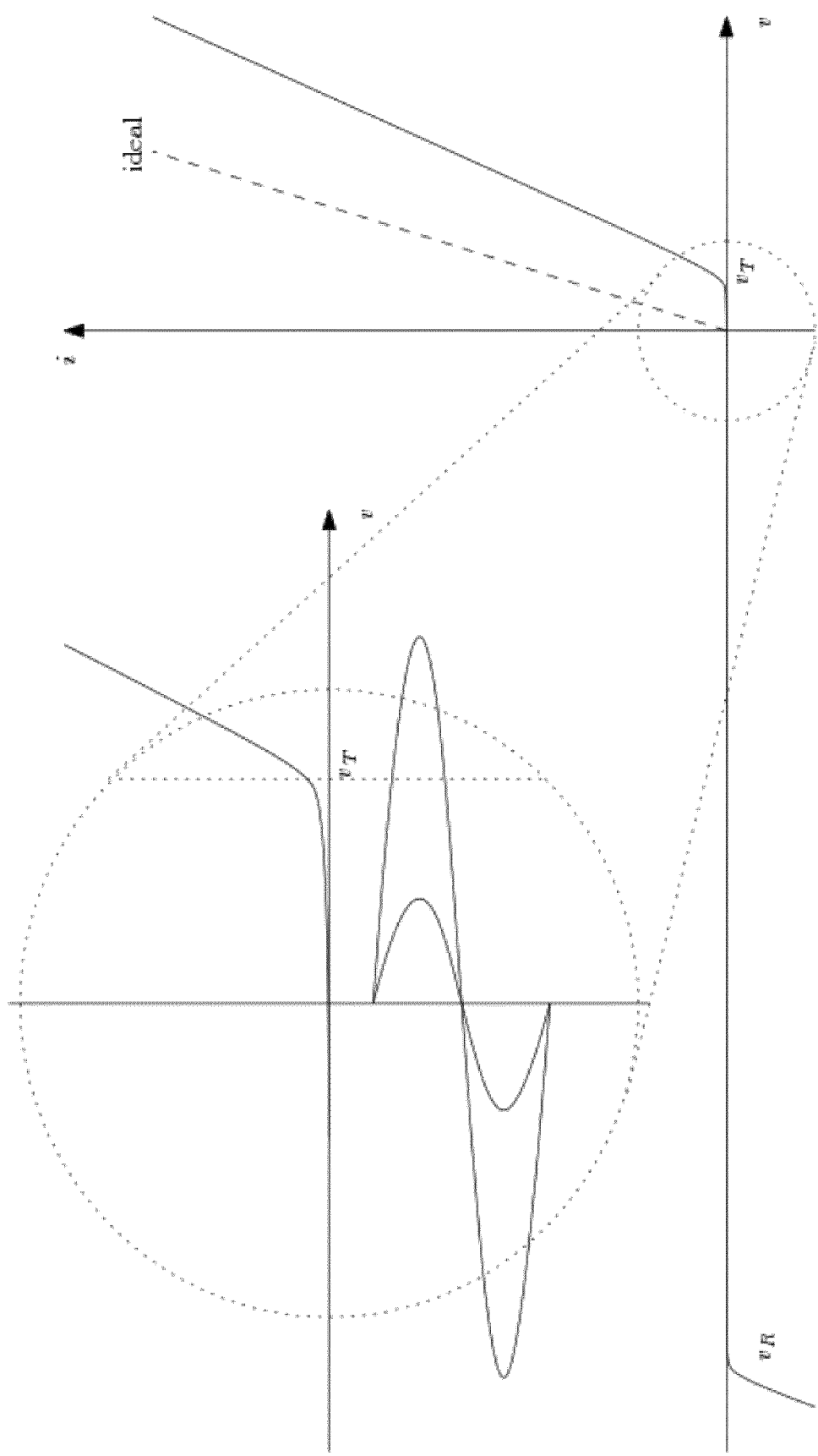
FIG. 9 shows a zoomed diode voltage-current characteristic.

As noted above, an important goal of the RF energy transfer is to convey sufficient power to the EH 210 so that the EH 210 can process the received information and transmit information back to the first wireless device 100. As demonstrated in FIG. 9, a simple diode-like non-linear rectifier, such as may be used in the rectenna 212, will activate only after the applied DC voltage exceeds a threshold voltage $v_T$. The same concept is true for the second wireless device 200, where the RF power provided by the PPM waveform must first be strong enough to activate the EH 210, e.g., must exceed an activation threshold of the EH 210, and must further be strong enough to power the processing circuit 214 to process synchronize and extract information from the received PPM waveform, and to power the transmitter 220 to send information back to the first wireless device 100 via the reverse link 30. The solution presented herein helps relax the power requirements of the second wireless device 200, and thus the power requirements of the WIPT system 10 because the PPM waveform disclosed herein is simple to demodulate. For example, the PPM waveform discussed herein may be processed using non-coherent or semi-coherent demodulations, which reduces the complexity associated with some processing operations, e.g., timing and channel estimation.

The solution presented herein provides multiple advantages over conventional WIPT systems. First, the synchronizable PPM waveform disclosed has a CF (or PAPR) that herein closely approximates that of the in-phase multi-sine signal that is optimal for WPT systems. Further, as noted above, the PPM waveform disclosed herein employs simple modulation/demodulation techniques, which simplifies the receiver structure, and thus reduces the power requirements of the EH 210. Also, unlike conventional OFDM solutions, transmitting the PPM waveform disclosed herein does not require a highly linear power amplifier in the transmitter. The PPM waveform disclosed herein is also fully synchronizable, and enables full time division duplexing for transmissions between the ET 110 and the EH 210. The use of the Gabor pulse for the generation of the PPM waveform disclosed herein also simplifies carrier selection/migration, and enables the EH 210 to use the received PPM waveform as a timing reference.

The following provides implementation examples that align with the above description. It will be appreciated that the solution presented herein is not limited to these detailed examples.

One exemplary synchronizable PPM waveform is a GPPM waveform, which is constructed using Gabor pulses. The ET 110 may construct the GPPM waveform by modifying a PPM waveform according to the following constraints and extensions:

A GPPM waveform includes two types of symbols: pulsed modulation symbols that carry information and energy and non-pulsed guard symbols that do not carry information or energy.

A frame of a GPPM waveform contains an even number of modulation symbols.

The duration of a modulation symbol of alphabet size Q is extended from Q-slots to (Q+1)-slots.

The leading slot in a modulation symbol, e.g., the 0-slot, is a slot for a sync pulse.

A modulation symbol in a GPPM waveform is modulated by a Q-PPM following the sync pulse, e.g., the PPM modulation pulse is shifted from {0, Q-1} to {1,Q}.

Each modulation symbol is followed by two non-pulsed guard symbols of total 2(Q+1)-slots.

The even numbered (where counting starts from 0) modulation symbols in a GPPM waveform, together with the following two non-pulsed guard symbols, are time reversed (flipped).

There is an offset between GPPM signals in forward and reverse links, where this offset is two-symbol, 2(Q+1)-slots.

There is a non-PPM guard symbol of (Q+1)-slots between modulation symbols of the forward and the reverse links, due to the offset, allowing a sufficient silent gap for radio switching (e.g., with Rx/Tx shared antenna).

In a GPPM waveform, the modulation symbol plus the two subsequent guard symbols may be also considered as a composite symbol that implements a subset of 2MPPM symbols of alphabet 3(Q+1), where a constraint has been set so that the leading slot is always a pulse slot, and the remaining 1 pulse in confined to {1,Q} slots for modulation. The time reversed even symbols comprise another mirroring subset of 2MPPM. FIG. 8 shows three GPPM modulation symbols, together with the guard symbols, at alternating even and odd positions. Note that the flipping in time for the even symbol flips its pulse position.

Beside enabling a full Time Division Duplex (TDD) between forward and reverse links in a WIPT radio, a GPPM waveform thus constructed is fully synchronizable due to the back-to-back sync pulses and the guard symbols. Although a GPPM waveform is less efficient in terms of spectrum efficiency for information transferring, it actually improves the RF-DC efficiency of the rectenna. This can be seen from the PAPR of a GPPM, which is 3(Q+1)=2>Q, where the PAPR of a pure (one pulse per symbol) PPM would have a PAPR of Q. In addition, the sync pulse pair in the forward/reverse link GPPM waveforms can be also used for timing alignment in the WIPT radio.

Due to the predictability of the discharge (two equal level pulses in a confined interval in a composite symbol), a power efficient ET can be implemented for a GPPM waveform with a high PAPR utilizing the charge pump technique. FIG. 8 shows an example of time division duplex of the forward and reverse link signals, where the time-aligned forward and reverse links are both sending a sequence of symbol-(Q-1) in a Q-GPPM modulation format, where Q=4.

At the ET, the pulse can be generated with a Gaussian windowed carrier signal. At the EH, a low complex detector can be implemented with envelop detection or with a digital receiver combined with narrow-band oscillating filter and baseband sampling.

For a PPM waveform, the pulse duration is limited to avoid Inter-Symbol Interference (ISI). For a relatively narrow band GPPM waveform in a WIPT system, the maximum channel delay spread $M \ll T_c$. Still, we can chose $T_p = T_c = 2$. Then, the pulse signal in a slot can be treated as a 2 PPM modulation. This hierarchical view of the PPM waveform gives us an additional enhancement for reliable symbol synchronization due to the flipping of the even-symbol:

For all odd modulation symbols, the slots are coded as a 2 PPM-0 pulse.

For all even symbols, the slots are coded as a 2 PPM-1 pulse.

Figure 10:
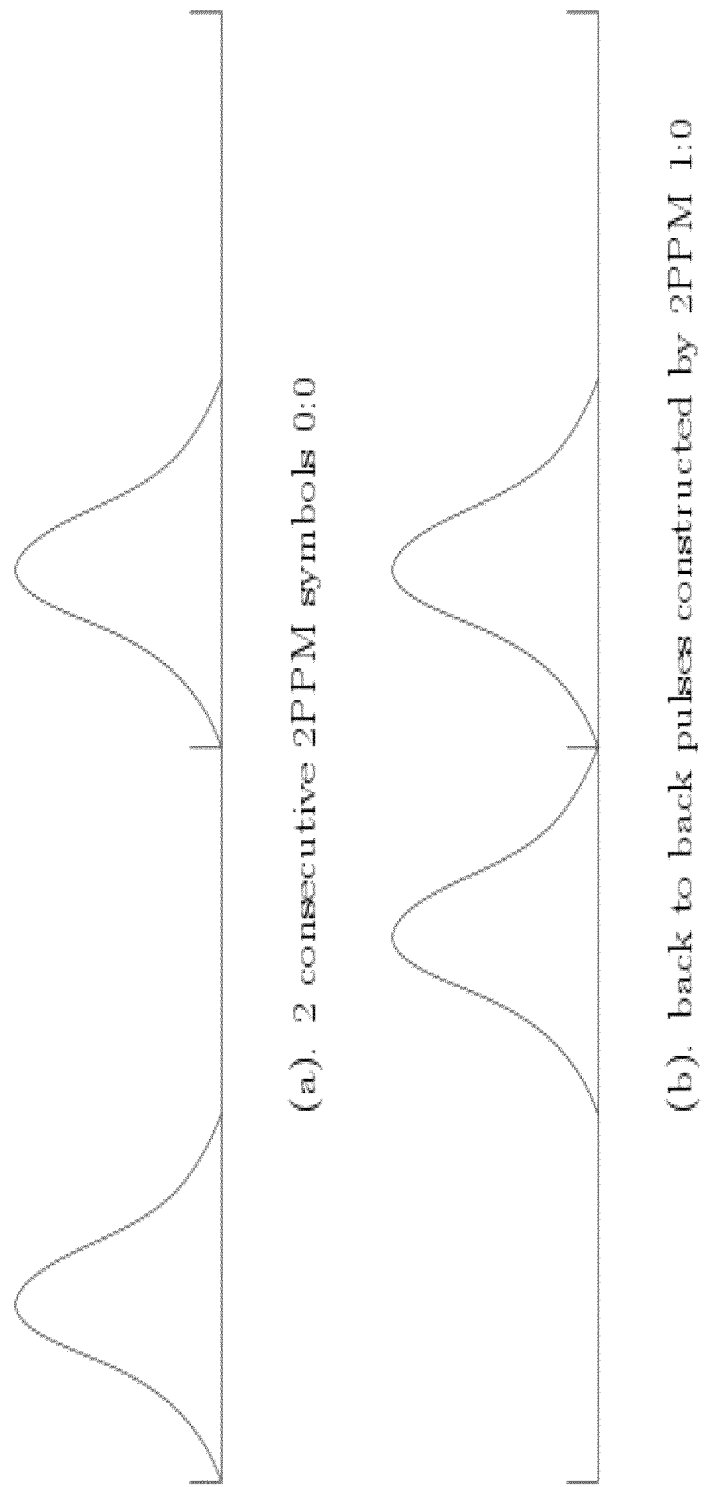
FIG. 10 shows back-to-back sync pulses due to even-symbol flipping.

Thus the flipping or time reversing of the even-symbols creates a unique back-to-back sync pulse pair, as show in FIG. 10. This sync pulse pair greatly reduces the synchronization complexity of the GPPM waveform.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A first wireless device of a Wireless Information and Power Transfer (WIPT) system, the first wireless device comprising:
an energy transmitter comprising a pulse modulation circuit and a transmission circuit, the energy transmitter being configured to simultaneously convey information and Radio Frequency (RF) power via a forward link to an energy harvester in a second wireless device in the WIPT system, the second wireless device being far-field from the first wireless device;
wherein the pulse modulation circuit is configured to generate a synchronizable Pulse-Position Modulation (PPM) waveform comprising a plurality of composite symbols, each of the composite symbols comprising at least one synchronization pulse and one or more pulses position-modulated responsive to the information to be conveyed to the energy harvester; and
wherein the transmission circuit is configured to transmit the synchronizable PPM waveform to the energy harvester via the forward link.

2. The first wireless device of claim 1, wherein a number of pulses in each of the plurality of composite symbols of the synchronizable PPM waveform is less than or equal to two.

3. The first wireless device of claim 1, wherein:
each composite symbol further comprises one or more guard symbols;
the synchronizable PPM waveform comprises a plurality of frames; and
each of said plurality of frames comprises at least one pair of composite symbols.

4. The first wireless device of claim 3, wherein:
each pair of composite symbols comprises a first composite symbol and a second composite symbol;

the first composite symbol comprises one or more pulsed modulation symbols followed by two guard symbols;

the second composite symbol follows the first composite symbol and comprises two other guard symbols followed by the one or more pulsed modulation symbols flipped in order relative to the first composite symbol; and either the first composite symbols are even composite symbols and the second composite symbols are odd composite symbols or the first composite symbols are the odd composite symbols and the second composite symbols are the even composite symbols.

5. The first wireless device of claim 4, further comprising a receiver circuit configured to receive a reverse link waveform from the second wireless device via a reverse link, wherein:

the reverse link waveform comprises a plurality of reverse link frames, each of said plurality of reverse link frames comprising at least one reverse link pair of composite symbols;

when the even composite symbol in each of the at least one pair of composite symbols in the synchronizable PPM waveform comprises one or more of the pulsed modulation symbols flipped in order relative to the odd composite symbol in each of the at least one pair of composite symbols in the synchronizable PPM waveform in the forward link, an odd composite symbol in each of the at least one reverse link pair of composite symbols in the reverse link waveform comprises one or more of the pulsed modulation symbols in a flipped order relative to an even composite symbol in each of the at least one reverse link pair of composite symbols in the reverse link waveform; and when the odd composite symbol in each of the at least one pair of composite symbols in the synchronizable PPM waveform comprises one or more of the pulsed modulation symbols flipped in order relative to the even composite symbol in each of the at least one pair of composite symbols in the synchronizable PPM waveform in the forward link, the even composite symbol in each of the at least one reverse link pair of composite symbols in the reverse link waveform comprises one or more of the pulsed modulation symbols in flipped in order relative to the odd composite symbol in each of the at least one reverse link pair of composite symbols in the reverse link waveform.

6. The first wireless device of claim 3, wherein at least one position-modulated pulse in each composite symbol and the at least one synchronization pulse are configured according to one or more synchronization constraints to enable symbol synchronization at the energy harvester.

7. The first wireless device of claim 6, wherein the one or more synchronization constraints comprises including each of the at least one synchronization pulses in a designated synchronization slot in each of the composite symbols.

8. The first wireless device of claim 7, wherein the designated synchronization slot comprises slot zero in each of the composite symbols.

9. The first wireless device of claim 6, wherein the one or more synchronization constraints comprises appending each of the at least one synchronization pulse to a pulsed modulation symbol within a corresponding composite symbol.

10. The first wireless device of claim 1, further comprising a receiver circuit configured to receive a reverse link waveform from the second wireless device via a reverse link, wherein the reverse link waveform is offset in time from the transmitted synchronizable PPM waveform by an offset period comprising an odd number of one or more of the composite symbols.

11. The first wireless device of claim 10, wherein the reverse link waveform has the same frame structure as the transmitted synchronizable PPM waveform and a complementary flipped orientation relative to that of the forward link.

12. The first wireless device of claim 10, further comprising an antenna shared between the energy transmitter and the receiver circuit and configured to switch from one of the energy transmitter and the receiver circuit to the other of the energy transmitter and the receiver circuit during the offset period.

13. The first wireless device of claim 1, wherein to generate the synchronizable PPM waveform, the pulse modulation circuit is configured to use Gabor pulses.

14. A method, implemented by a first wireless device in a Wireless Information and Power Transfer (WIPT) system, the method comprising:

generating a synchronizable Pulse-Position Modulation (PPM) waveform comprising a plurality of composite symbols, each of the composite symbols comprising at least one synchronization pulse and one or more pulses position-modulated responsive to information to be conveyed to an energy harvester of a second wireless device in the WIPT system, the second wireless device being far-field from the first wireless device; and transmitting, from an energy transmitter, the synchronizable PPM waveform to the energy harvester via a forward link such that the information and Radio Frequency (RF) power are simultaneously conveyed to the energy harvester.

15. The method of claim 14, wherein a number of pulses in each of the plurality of composite symbols of the synchronizable PPM waveform is less than or equal to two.

16. The method of claim 14, wherein:
each composite symbol comprises one or more guard symbols;
the synchronizable PPM waveform comprises a plurality of frames; and
each of said plurality of frames comprises at least one pair of composite symbols.

17. The method of claim 16, wherein:
each pair of composite symbols comprises a first composite symbol and a second composite symbol;
the first composite symbol comprises one or more pulsed modulation symbols followed by two guard symbols;
the second composite symbol follows the first composite symbol and comprises two other guard symbols followed by the one or more pulsed modulation symbols flipped in order relative to the first composite symbol; and either the first composite symbols are even composite symbols and the second composite symbols are odd composite symbols or the first composite symbols are the odd composite symbols and the second composite symbols are the even composite symbols.

18. The method of claim 17, further comprising receiving a reverse link waveform from the second wireless device via a reverse link, wherein:

the reverse link waveform comprises a plurality of reverse link frames, each of said plurality of reverse link frames comprising at least one reverse link pair of composite symbols;

when the even composite symbol in each of the at least one pair of composite symbols in the synchronizable PPM waveform comprises one or more of the pulsed modulation symbols in a flipped order relative to the odd composite symbol in each of the at least one pair of composite symbols in the synchronizable PPM waveform in the forward link, an odd composite symbol in each of the at least one reverse link pair of composite symbols in the reverse link waveform comprises one or more of the pulsed modulation symbols flipped in order relative to an even composite symbol in each of the at least one reverse link pair of composite symbols in the reverse link waveform; and when the odd composite symbol in each of the at least one pair of composite symbols in the synchronizable PPM waveform comprises one or more of the pulsed modulation symbols flipped in order relative to the even composite symbol in each of the at least one pair of composite symbols in the synchronizable PPM waveform in the forward link, the even composite symbol in each of the at least one reverse link pair of composite symbols in the reverse link waveform comprises one or more of the pulsed modulation symbols flipped in order relative to the odd composite symbol in each of the at least one reverse link pair of composite symbols in the reverse link waveform.

19. The method of claim 16, wherein at least one position-modulated pulse in each composite symbol and the at least one synchronization pulse are configured according to one or more synchronization constraints to enable symbol synchronization at the energy harvester.

20. The method of claim 19, wherein the one or more synchronization constraints comprises including each of the at least one synchronization pulses in a designated synchronization slot in each of the composite symbols.

21. The method of claim 20, wherein the designated synchronization slot comprises slot zero in each of the composite symbols.

22. The method of claim 19, wherein the one or more synchronization constraints comprises appending each of the at least one synchronization pulse to a pulsed modulation symbol within a corresponding composite symbol.

23. The method of claim 14, further comprising receiving a reverse link waveform from the second wireless device via a reverse link, wherein the reverse link waveform is offset in time from the transmitted synchronizable PPM waveform by an offset period comprising an odd number of one or more of the composite symbols.

24. The method of claim 23, wherein the reverse link waveform has the same frame structure as the transmitted synchronizable PPM waveform and a complementary flipped orientation relative to that of the forward link.

25. The method of claim 23, further comprising switching an antenna array from one of the energy transmitter and a receiver circuit to the other of the energy transmitter and the receiver circuit during the offset period.

26. The method of claim 14, wherein the synchronizable PPM waveform is generated using Gabor pulses.

27. A non-transitory computer-readable medium storing a computer program product for controlling a programmable first wireless device in a Wireless Information and Power Transfer (WIPT) system, the computer program product comprising software instructions that, when run on the programmable first wireless device, cause the programmable first wireless device to:

generate a synchronizable Pulse-Position Modulation (PPM) waveform comprising a plurality of composite symbols, each of the composite symbols comprising at least one synchronization pulse and one or more pulses position-modulated responsive to information to be conveyed to an energy harvester of a second wireless device in the WIPT system, the second wireless device being far-field from the programmable first wireless device; and transmit, from an energy transmitter, the synchronizable PPM waveform to the energy harvester via a forward link such that the information and Radio Frequency (RF) power are simultaneously conveyed to the energy harvester.

* * * * *